US008386078B1

(12) United States Patent
Hickman et al.

(10) Patent No.: US 8,386,078 B1
(45) Date of Patent: Feb. 26, 2013

(54) METHODS AND SYSTEMS FOR PROVIDING A DATA LIBRARY FOR ROBOTIC DEVICES

(75) Inventors: Ryan Hickman, Mountain View, CA (US); Damon Kohler, Mountain View, CA (US); Anthony Gerald Francis, Jr., Mountain View, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/463,345

(22) Filed: May 3, 2012

Related U.S. Application Data

(60) Provisional application No. 61/483,291, filed on May 6, 2011, provisional application No. 61/595,761, filed on Feb. 7, 2012.

(51) Int. Cl.
*G06N 5/02* (2006.01)
(52) U.S. Cl. .................................... 700/245; 318/568.1
(58) Field of Classification Search .......... 700/245–250, 700/253, 255, 258, 259; 318/568.1, 568.11–568.13, 318/568.16, 568.19
See application file for complete search history.

(56) References Cited

U.S. PATENT DOCUMENTS

| | | | |
|---|---|---|---|
| 6,675,156 B1 | 1/2004 | McIntyre et al. | |
| 7,941,242 B2* | 5/2011 | Colvig et al. | 700/213 |
| 8,214,079 B2* | 7/2012 | Lee et al. | 700/245 |
| 2008/0243305 A1 | 10/2008 | Lee et al. | |
| 2009/0187278 A1 | 7/2009 | Zhuk | |
| 2009/0254217 A1* | 10/2009 | Pack et al. | 700/246 |
| 2011/0071676 A1* | 3/2011 | Sanders et al. | 700/250 |
| 2011/0190931 A1* | 8/2011 | Anderson et al. | 700/253 |
| 2012/0178431 A1* | 7/2012 | Gold | 455/420 |

FOREIGN PATENT DOCUMENTS

| | | |
|---|---|---|
| JP | 2005111603 | 4/2005 |
| JP | 2005279828 | 10/2005 |
| WO | WO 2009/097336 | 8/2009 |

OTHER PUBLICATIONS

Hubel et al., "Learning and Adaptation in Dynamic Systems: A Literature Survey", ICT Call 4 RoboEarth Project 2010-248942, http://www.roboearth.org, Apr. 1, 2010.

* cited by examiner

*Primary Examiner* — Dalena Tran
(74) *Attorney, Agent, or Firm* — McDonnell Boehnen Hulbert & Berghoff LLP

(57) ABSTRACT

Methods and systems for robot cloud computing are described. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. A robot may interact with the cloud to perform any number of actions, such as to share information with other cloud computing devices. A robot's performance of a task can be augmented by a cloud service which contains a data library of elements which are delivered to the robot to help the robot execute actions.

22 Claims, 10 Drawing Sheets

METHODS AND SYSTEMS FOR PROVIDING A DATA LIBRARY FOR ROBOTIC DEVICES

CROSS-REFERENCE TO RELATED APPLICATION

The present application claims priority to U.S. Provisional Patent Application Ser. Nos. 61/483,291, filed on May 6, 2011 and 61/595,761 filed on Feb. 7, 2012, the entire contents of each of which are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

In one example, a method is provided that includes receiving a request from a robotic device for access to a data library to receive a data element stored in the data library. The request may include information associated with a task of the robotic device. The data library stores data elements that include information configured for use by a given robotic device and that are associated with instructions executable by the given robotic device to perform a heuristic for interaction with an environment. The data elements are further associated with respective metadata that is indicative of a requirement of the given robotic device for using a given data element to perform at least a portion of an associated heuristic for interaction with the environment. The method also comprises determining the data element from among the data elements stored in the data library that is executable by the robotic device to perform at least a portion of the task of the robotic device. The method further comprises causing the data element to be conveyed to the robotic device.

In another example, a method is provided that includes a robotic device performing an activity, and the robotic device determining a heuristic for interaction with an environment during performance of the activity. The method also includes in response, the robotic device sharing with a second device in substantially real-time at least a portion of information associated with the heuristic for interaction with the environment. The portion of information associated with the heuristic for interaction with the environment comprises information associated with a state of the robotic device and a function performed by the robotic device to carry out at least a portion of the activity.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices or systems may be used or configured to perform logical functions in any processes or methods described herein. As one example, a system may be provided that includes an interface, a control unit, and an update unit. The interface may be configured to provide communication between a robotic device and a data library. The data library stores data elements including information configured for use by a given robotic device and that are associated with instructions executable by the given robotic device to perform a heuristic for interaction with an environment, and the data elements stored in the data library are further associated with respective metadata that is indicative of a requirement of the given robotic device for using a given data element to perform at least a portion of an associated heuristic for interaction with the environment. The control unit may be configured to determine a data element from among the data elements stored in the data library that is executable by the robotic device to perform at least a portion of a task of the robotic device, and to cause the data element to be conveyed to the robotic device via the interface. The update unit may be configured to provide to the robotic device via the interface an update of application-specific instructions for use in a corresponding data element stored on the robotic device.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. A robot may perform any actions or queries to the cloud as described herein based on contextual or situational information.

1. Cloud Computing Architecture

Figure 1:
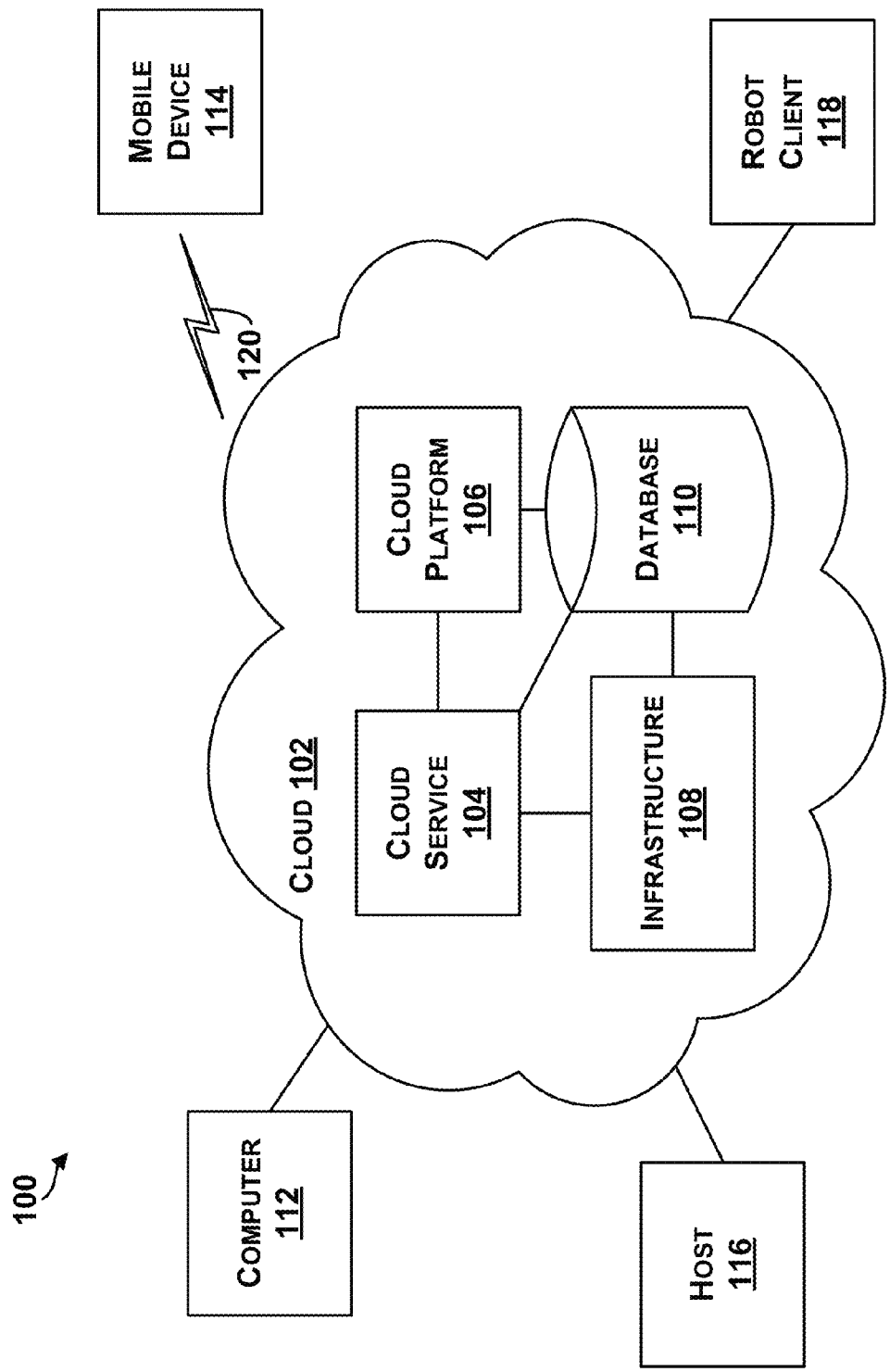
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three—tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
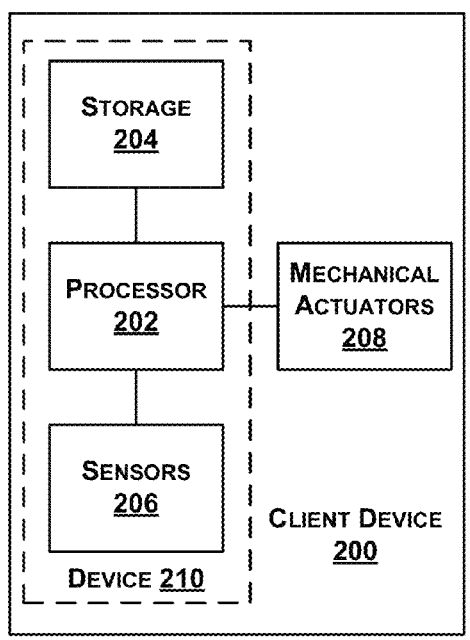
FIG. 2A illustrates an example client device.

FIG. 2A illustrates an example client device 200. In one example, the client device 200 is configured as a robot. In some examples, a robot may be contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
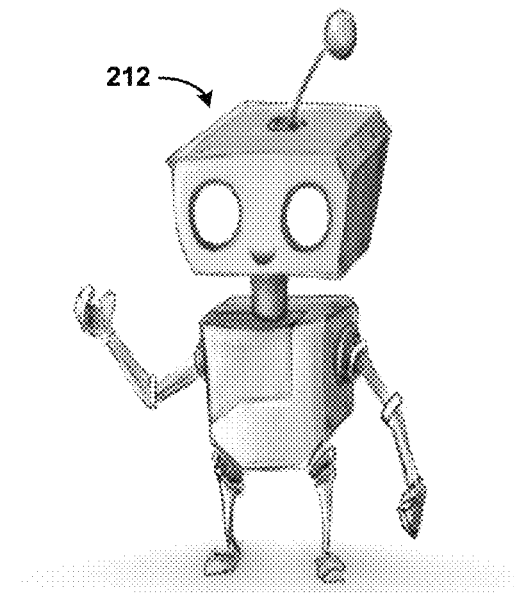
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
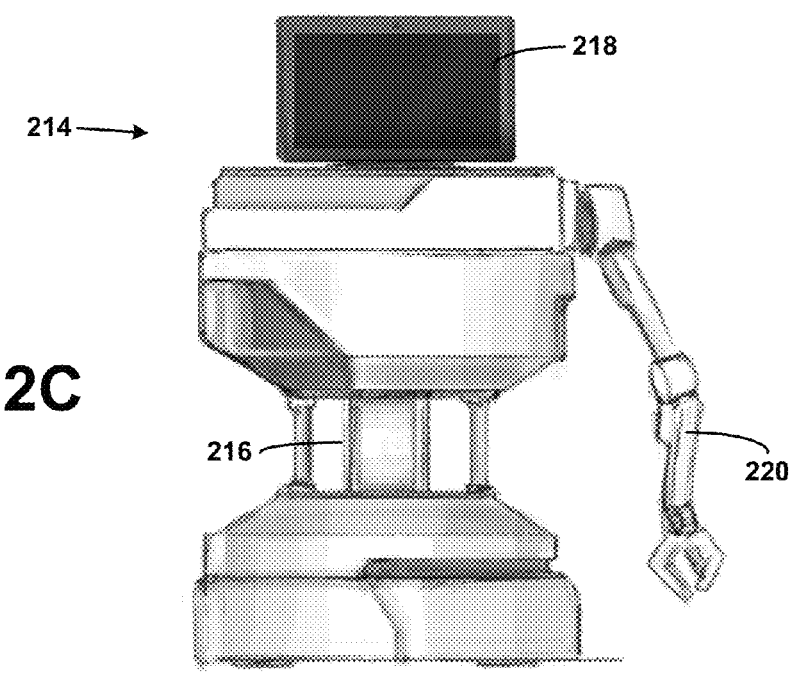
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
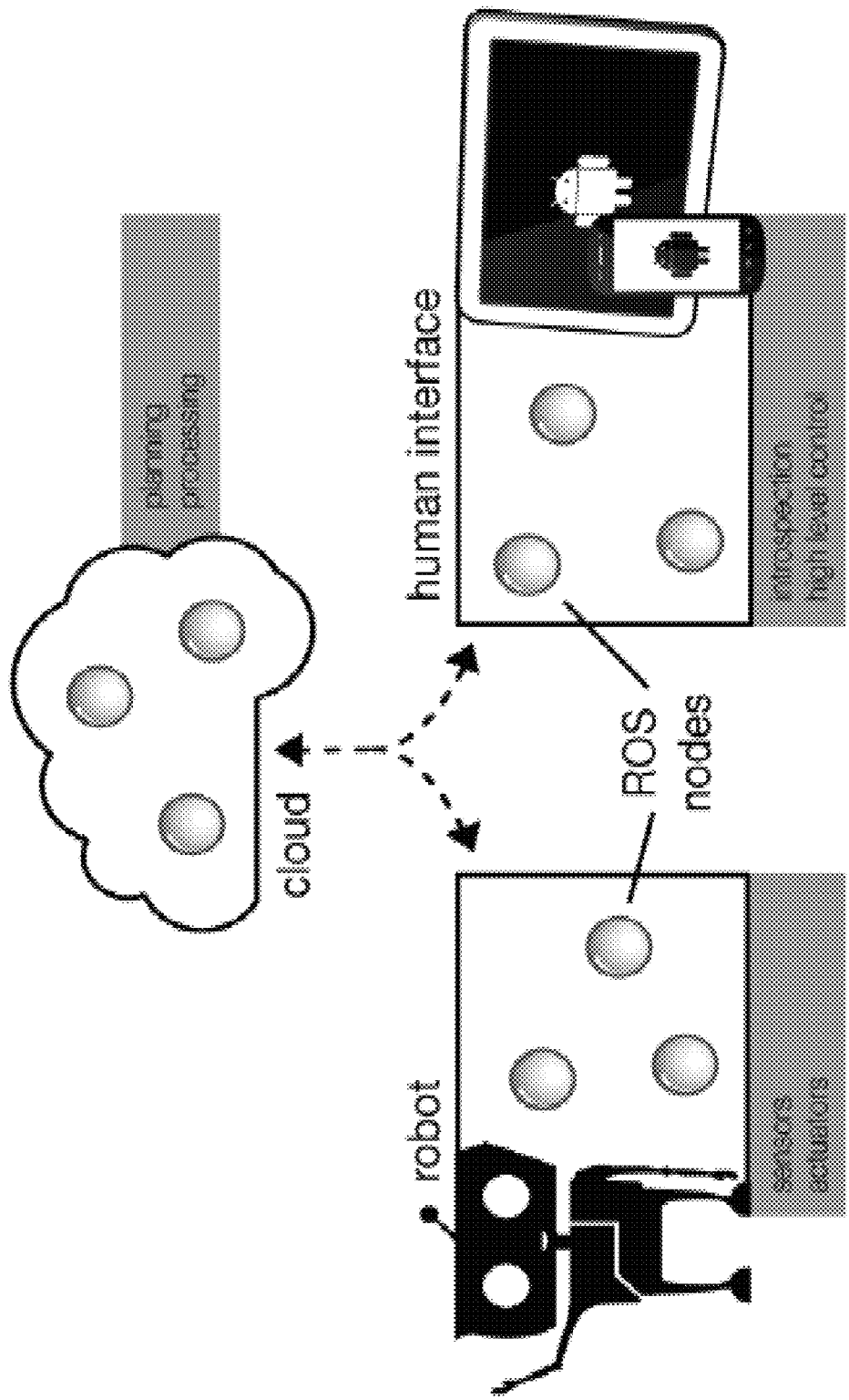
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4A:
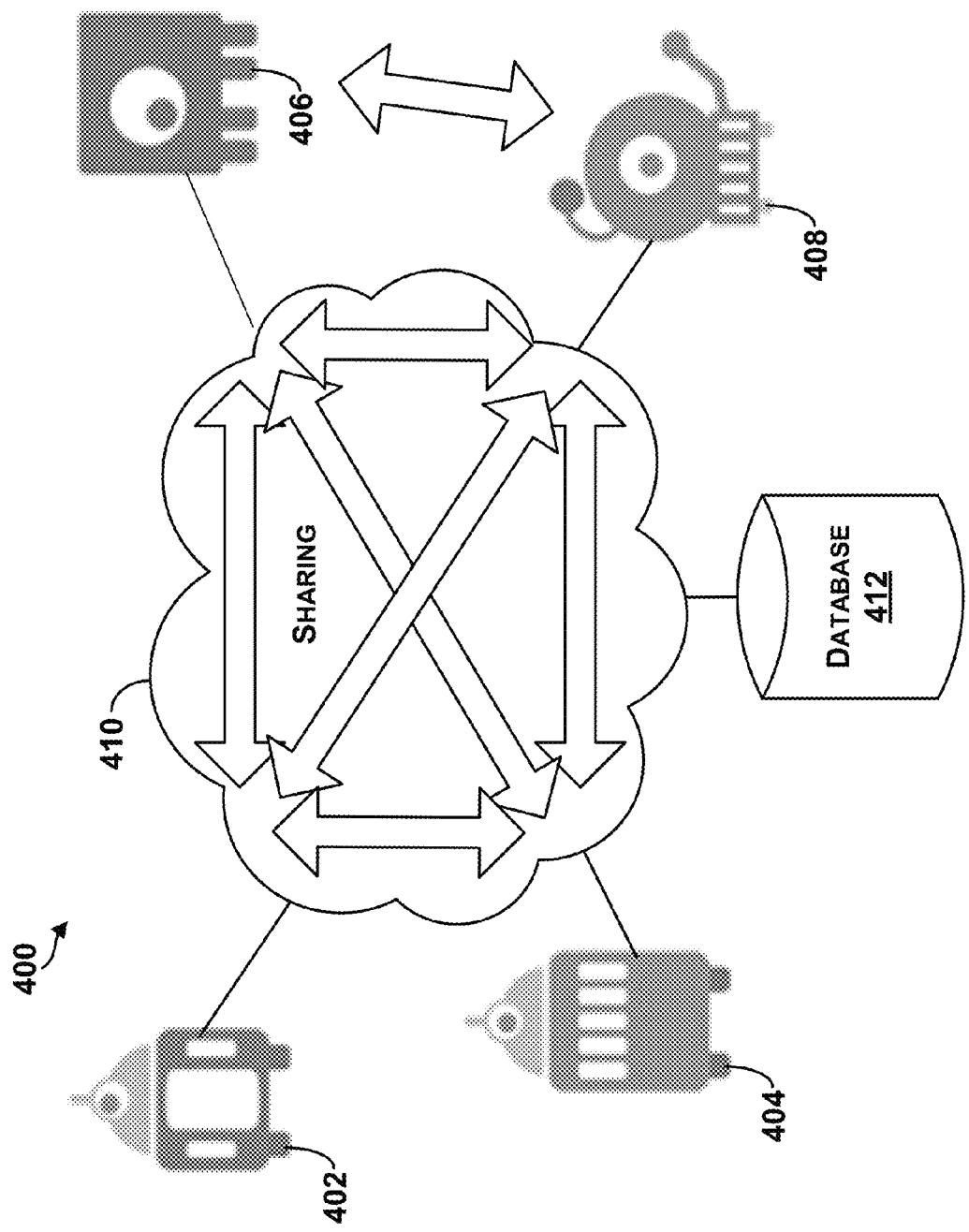
FIG. 4A is an example system in which robots may interact with the cloud and share information with other cloud computing devices.

FIG. 4A is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

In some examples, the system 400 enables sharing learned behaviors between robotic devices in real-time. For example, a given robotic device may determine actions to perform to pick up a cup, and information associated with the actions can be published to the cloud 410 and shared with all cloud-connected robotic devices. Other robotic devices may receive a notification of the shared information during performance of a task and can utilize the shared information to continue performance of the task, for example. Such shared learning enables less complex robotic devices to take advantage of information collected by more complex robotic devices that may include more sensors, etc. The shared learning may be associated with a process used to determine a model for an unknown or partially known system with unknown input trajectories to achieve a desired output behavior. The robotic devices may store or maintain the shared state in the cloud, for example.

The shared information may further include information about an area, for example, a robotic device may traverse a pathway and encounter an obstacle and can inform other robotic devices (through a server, e.g., "the cloud") of a location of the obstacle. Each robotic device may have access to real-time up to date data. Thus, sharing of information enables real-time or temporal learning that a door is closed, for example, and that the robotic device may adjust a navigation pathway according.

The shared information may include a state of the robotic device and a function performed. For example, a server may determine the state of the robotic device and can identify information to share with the robotic device to perform a function based on the state. In such an instance, a robotic device may be configured to localize and identify a state (e.g., using simultaneous localization and mapping (SLAM) techniques). Generally, in instances in which the robotic device does not have information on an object or information to complete a task, the robotic device can query a server to receive shared information on an as-needed basis.

Figure 4B:
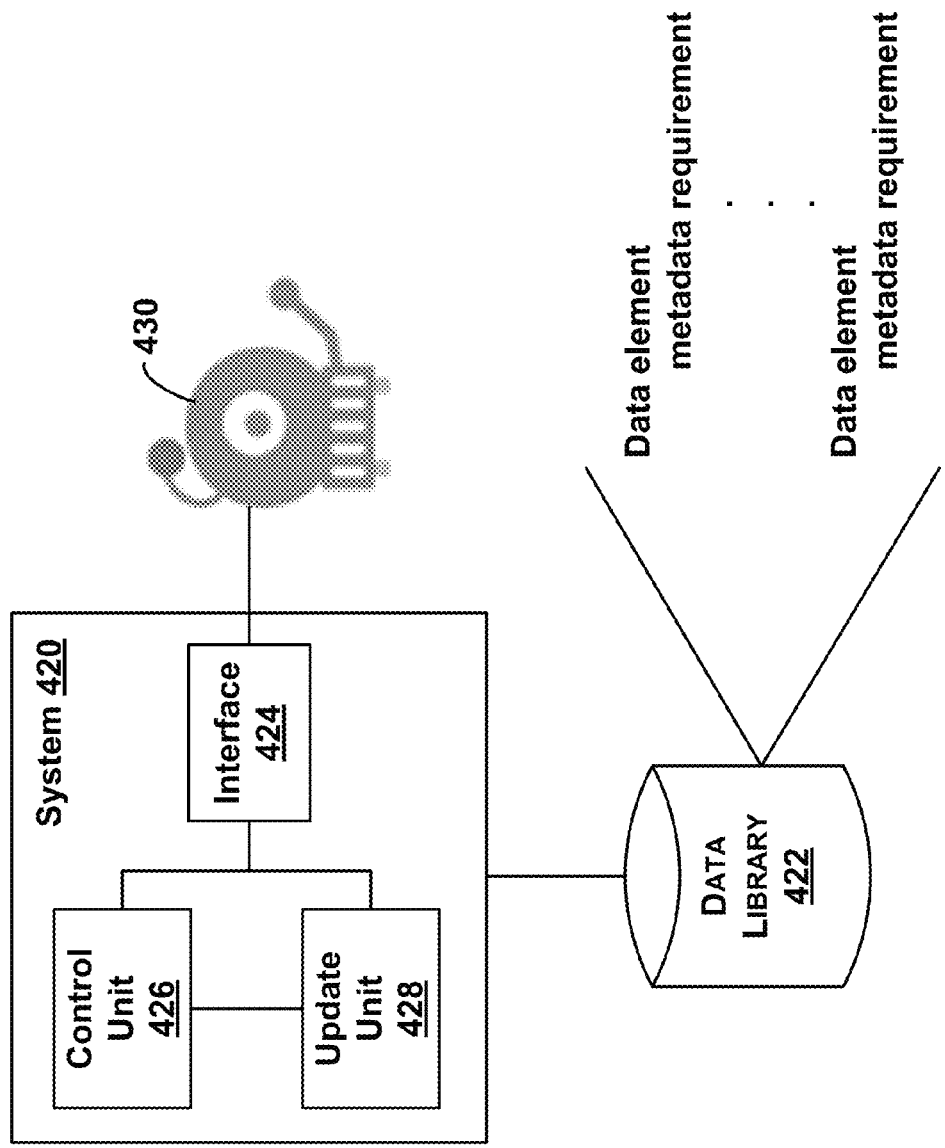
FIG. 4B is a block diagram of an example system configured to provide access to a data library.

FIG. 4B is a block diagram of an example system 420 configured to provide access to a data library 422. The system 420 may include an interface 424, a control unit 426, and an update unit 428 each in communication with the other or coupled to each other. The system 420 may take the form of a computing device residing in the cloud 410 (as shown in FIG. 4B) or coupled to the cloud 410, for example. The system 420 and/or components of the system 420 may have functions that are executable via executing instructions stored in memory.

The data library 422 may be or include the database 412 of FIG. 4B. In some examples, the data library 422 is configured to store data elements that include information configured for use by a robotic device 430. The data library 422 may store any number of data elements, and may be configured as an "app store" for robotic devices.

In one example, the data elements may be or include instructions executable by the robotic device 430 to perform a heuristic for interaction with an environment. Thus, the data elements may be considered applications that can be executed by the robotic device 430 to perform a function. As an example, a data element may be a "coffee making app", and the robotic device 430 may access the system 420 to receive the coffee making app data element, which can be executed by the robotic device 430 to perform functions associated with making coffee. Any number and variety of data elements/applications may be provided in the data library 422, and the data elements can be configured for use by robotic devices.

In another example, the data elements may be or include data packages that can be downloaded by the robotic device 430. For example, a data element may include a geographical or navigational maps package for the robotic device 430, which the robotic device 430 can utilize to make determinations for traversing through an area.

In still other examples, the data elements may be or include application-specific instructions. For example, the robotic device 430 may include an application configured to receive application-specific instructions, and the robotic device 430 may download an update of a set of application-specific instructions for use in the application. As a specific example, the robotic device 430 may include a general cooking application, and the robotic device 430 may access the data library 422 to receive additional recipes for the cooking application.

In yet other examples, the data elements may be or include remote teleoperation applications. For example, the remote teleoperation application may be executed by the robotic device 430 to enable the robotic device 430 to be remotely operated by a user to perform a function. In a specific example, a remote teleoperation application may include the robotic device executing an application to enable a cook to remotely control the robotic device to prepare a meal.

In further examples, the data elements may be or include videos accessible by the robotic device 430 or from which the robotic device 430 can determine a heuristic for interaction with an environment. As an example, a data element may include a video that illustrates a person interacting with an object (e.g., vacuuming a room with a vacuum). The robotic device 430 may determining semantic information from the video by comparing a robot model of a human to a human interaction with the object in the video, and determine information associated with emulating the human interaction based on a mapping between the robot model and the human interaction. In one example, videos including humans interacting with the object may be indexed and made available as data elements that can be provided to the robotic device 430, which may utilize the videos to determine heuristics for interaction with an environment or object (e.g., an image matching or recognition process may be used to determine how the human interacts with the object and based on a mapping between the robot model and the human interaction, the robotic device may hold the handle of the vacuum while attempting to vacuum a surface).

Generally, the data library 422 may store data elements that include information configured for use by a robotic device to interact with an environment.

The data elements may be further associated with respective metadata that is indicative of a requirement of the robotic device 430 for using a given data element to perform at least a portion of an associated heuristic for interaction with the environment. For example, the data elements may be labeled with information that indicates specific requirements of a given robotic device to execute an application associated with the data elements to or to perform a function associated with the data elements. Example requirements may include indicating a model number of compatible robots (e.g., robots including necessary mechanical actuators, processing power, etc.), or specific hardware/software requirements of the robotic device.

The data elements may be further associated with respective metadata that indicates information that can be updated. For example, a data element may include information about a specific computer printer (e.g., a location, instructions for use, amount of paper in a printer tray), and the metadata may be updated to indicate an amount of available paper in the printer tray or a new location if the printer is moved.

The interface 424 may be configured to provide communication between the robotic device 430 and the data library 422. The interface 424 may include a wired or wireless interface, and may include a networked interface as well.

The control unit 426 may be configured to determine a data element from among the data elements stored in the data library 422 that is executable by the robotic device to perform at least a portion of a task of the robotic device 430. The control unit 426 may determine a task of the robotic device 430 through information received in a request from the robotic device 430, or via a query to the robotic device 430. In some examples, the control unit 426 may determine a general action of the robotic device 430 (e.g., making coffee), and may determine a task of the action (e.g., place coffee grounds into coffee maker) via access to a data store that maps actions to tasks.

The control unit 426 may be further configured to cause the data element to be conveyed to the robotic device 430 via the interface 424. The data element can be sent to the robotic device 430 at any time, such as during a down period of the robotic device 430 or on an as-needed basis. The control unit 426 may be in communication with the robotic device 430 continually or periodically, determine a task of the robotic device 430, and provide a data element to the robotic device 430 to enable the robotic device 430 to perform the task, for example, so as to provide an on-demand app store to the robotic device 430.

The control unit 426 may be configured to determine the data element based on one or more of user preferences for the robotic device 430 (e.g., pre-stored preferences), an environment in which the robotic device 430 resides, capabilities of the robotic device 430, or a software developer of the data element. Thus, the control unit 426 may filter which data elements are provided to the robotic device 430 based on many factors.

The control unit 426 may be configured to receive from the robotic device 430 feedback indicating information associated with a rating of the data element. The rating may be indicative of an amount of success by the robotic device 430 to perform at least a portion of the task via execution of the data element. For example, if the robotic device 430 was able to successfully make a cup of coffee using the coffee making app, the robotic device 430 may provide a positive feedback to the control unit 426.

The update unit 428 may be configured to provide to the robotic device 430 via the interface 424 an update of application-specific instructions for use in a corresponding data element stored on the robotic device 430. As previously described, the robotic device 430 may include a cooking application, and the update unit 428 may determine recipe updates to provide to the robotic device 430 for use in the cooking application.

Thus, within examples, the robots 402, 404, 406, and 408 may share information through the cloud 410, and may access the database 412.

Figure 5:
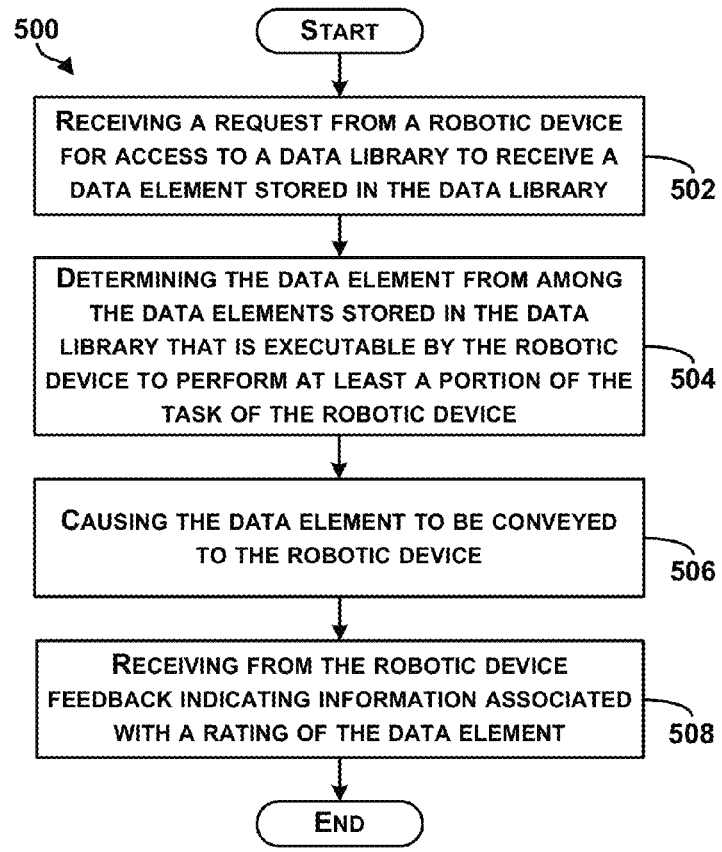
FIG. 5 is a block diagram of an example method of providing a robot app store.

FIG. 5 is a block diagram of an example method of providing a robot app store. Method 500 shown in FIG. 5 presents an embodiment of a method that, for example, could be used with the systems 100, 400, and 420, for example, and may be performed by a device, such as another devices illustrated in FIGS. 1-4, or components of the device. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. In addition, for the method 500, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM).

At block 502, the method 500 includes receiving a request from a robotic device for access to a data library to receive a data element stored in the data library. The request may include information associated with a task of the robotic device. In one example, the robotic device may begin an action and may not be able to complete the action due to lack of instructions/software to execute to perform the action. The robotic device may then responsively send a request to a server to receive a given data element that may correspond to the task to be performed.

The data library may store a number of data elements that each include information configured for use by a given robotic device and that are each associated with instructions executable by the given robotic device to perform a heuristic for interaction with an environment. The heuristic for interaction with the environment may include a physical interaction with the environment, for example.

The data elements may be further associated with respective metadata that is indicative of a requirement of the given robotic device for using a given data element to perform at least a portion of an associated heuristic for interaction with the environment. As one example, the requirement may be for the robotic device to include or have access to a specific sensor to perform a function of the data element (e.g., a weight sensor if the function of the data element requires determining a weight of an object) or a mechanical actuator required to perform a given task via execution of the given data element.

At block 504, the method 500 includes determining the data element from among the data elements stored in the data library that is executable by the robotic device to perform at least a portion of the task of the robotic device. In one example, a search of the data library is performed to identify the data element that matches to the task. In some examples, a search of the library is performed to identify the data element that additionally matches to capabilities of the robotic device by reviewing metadata information of the data elements. In this manner, the data element that may be executed by the requesting robotic device to perform a task of the requesting robotic device may be identified.

Data elements may further be selected or identified based on other factors as well, such as based on user preferences for the robotic device, an environment in which the robotic device resides (e.g., for aquatic robotic devices, filter out land-based applications), or a software developer of the data element (e.g., filter out untrusted software developers based on preferences).

In some examples, data elements have include or be associated with an algorithm for determining whether the data elements are a match to a robotic device or to a certain task. For instance, the algorithm may query the robotic device to determine capabilities of the robotic device or to determine more information regarding the ask to determine whether the data element is a match.

At block 506, the method 500 includes causing the data element to be conveyed to the robotic device. The data element may be sent via wired or wireless communication links to the robotic device. In some examples, the data element may be provided to the robotic device via a network connection or over the cloud.

The data element may be sent at any time, and in some examples, the data element may be sent during a downtime of the robotic device. For instance, a time when the robotic device is in a standby mode that indicates that the robotic device is not in operation can be determined, and the data element can be conveyed to the robotic device during the time when the robotic device is in the standby mode.

In some examples, data elements may be conveyed to the robotic device after a payment is received for the data element. Thus, all data elements may be provided for purchase, and after the payment is received, the data element can be sent to the robotic device.

Data elements may also be conveyed to the robotic device based on user constraints, based on preset rules (e.g., during downtime of the robotic device), or based on a category of the data element (e.g., a security robotic device may be configured to receive security applications).

At block 508, the method 500 includes receiving from the robotic device feedback indicating information associated with a rating of the data element. The rating may be indicative of an amount of success by the robotic device to perform at least a portion of the task via execution of the data element. A manner in which the robotic device makes a determination success of performing the task using the data element may depend on the task being performed. As one example, if the task is to make a cup of coffee for a user, success can be determined by the robotic device querying the user to ask whether the task was completed successfully. As another example, after performing a task, the robotic device can capture an image of a scene (e.g., take a picture of the cup of coffee), and send the image to a server that can process the image to determine whether the image indicates that the task has been completed successfully (e.g., compare the image of the cup of coffee with stored images of known successful completions of the task for making a cup of coffee). As still another example, success can be determined based on an outcome of execution of the data element (e.g., if the task is to pick up an object, after execution of the data element, success can be determined by the robotic device determining whether the robotic device currently holds the object). Thus, the robotic device can make a determination about success of performing the task using the data element based on querying a user, querying a server or other local device, or making the determination itself.

In some examples, the feedback received for a data element can be stored or associated with the data element in the data library. Thus, the data library may store information associated with data elements that is derived from information received from robotic devices and determined by the robotic devices during performance of given tasks. A rating of the data element may be determined based on feedback received for the data element. The rating may be indicative of an amount of success by robotic devices to perform at least a portion of a task via execution of the data element. For example, a data element may receive a high rating when feedback has been positive (e.g., indicates success), or a low rating when feedback has been negative (e.g., indicates failure). Ratings may be high, low, or any level in between.

Feedback may be received from all robotic devices that have used a data element. In some examples, a mis-calibrated robotic device may use a data element, and due to mis-calibrations, may not be successful in performing the task. Feedback received from the robotic devices can be monitored (e.g., by tracking robotic device identifiers (ID)), such that continual negative feedback received from the same robotic device can be removed.

In some examples, the method 500 may further include determining the data element from among the data elements stored in the data library based also on the rating of the data element. Data elements that have poor ratings may not be conveyed to robotic devices. Alternatively, in some instances, more than one data element may be useful to perform a portion of the task of the robotic device, and the data element with the highest rating may be selected and conveyed to the robotic device.

In some examples, the method 500 may further include determining a second data element that is relevant to an activity of the robotic device, and in response, causing the second data element to be offered for purchase to the robotic device. In some examples, a server may query a robotic device to determine a task or activity of the robotic device, and the server may then determine if any data elements stored in the data library would be useful for the robotic device to perform any portion of the activity. When useful data elements are found, the server may offer the data elements to the robotic device, such as to offer for purchase or possibly to offer with no request for payment.

In some examples, using the method 500, an application may be matched to a task of a robotic device, and also to the robotic device itself. Applications may be matched to robotic devices and to tasks based on user's preferences, environment of the robotic device, capabilities of the robotic device, rating/scoring of the application so as to identify a correct application for the task, for example. Access to and dissemination of the applications or data elements can be performed using intelligence of the cloud.

Figure 6:
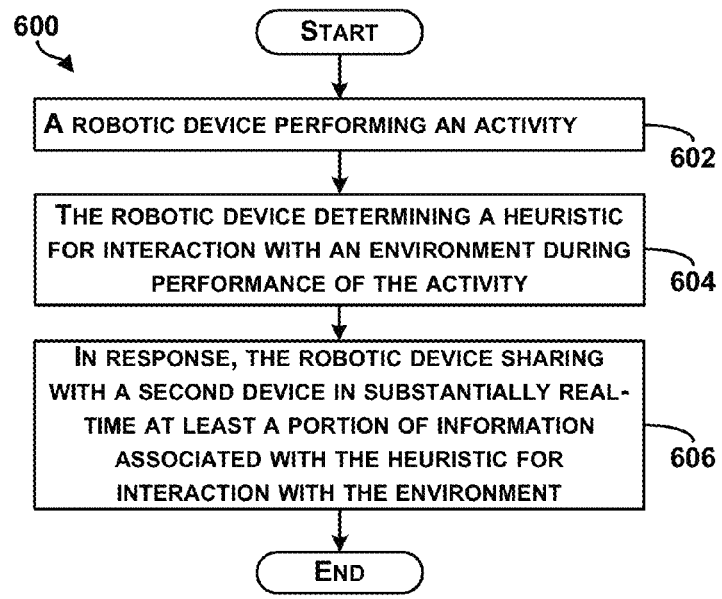
FIG. 6 is a block diagram of an example method of sharing information between devices.

FIG. 6 is a block diagram of an example method of sharing information between devices. Method 600 shown in FIG. 6 presents an embodiment of a method that, for example, could be used with the systems 100, 400, and 420, for example, and may be performed by a device, such as another devices illustrated in FIGS. 1-4, or components of the device. Method 600 may include one or more operations, functions, or actions as illustrated by one or more of blocks 602-606. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. In addition, for the method 600, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

At block 602, the method 600 includes a robotic device performing an activity. The activity may include a number of tasks, and may be any type of activity.

At block 604, the method 600 includes the robotic device determining a heuristic for interaction with an environment during performance of the activity. In one example, the robotic device may determine the heuristic for interaction with the environment during performance of the activity through trial and error. If the activity includes picking up an object, the robotic device may use sensors to determine a distance to the object, an amount to move a mechanical actuator to grasp the object, etc. The robotic device may further determine the heuristic for interaction with the environment during performance of the activity by determining a partially unknown model of functions to execute so as to perform a portion of the activity to achieve a desired output behavior. The robotic device may also access a database or server to determine information or functions to perform.

At block 606, the method 600 includes in response, the robotic device sharing with a second device in substantially real-time at least a portion of information associated with the heuristic for interaction with the environment. The portion of information associated with the heuristic for interaction with the environment may include information associated with a state of the robotic device (e.g., a configuration of components such as positions or locations of mechanical actuators) and a function performed by the robotic device to carry out a portion of the activity. The information may further be applicable for a limited amount of time, and thus, may expire. For example, the configuration of the robotic device to perform the function may be reliant upon a position of objects, etc., and if the position of the objects is modified, the configuration may no longer be appropriate.

The second device may include another robotic device, or the second device may include a server that maintains a data library of shared information. In further examples, the method 600 may include modifying a data library to store the information shared by the robotic device so as to generate a database of shared information. The database of shared information may be or include information such as within the data library of FIG. 4B. In some examples, the method 600 may include a number of robotic devices sharing information that can be stored and compiled within the data library, and functions based on the information can be determined and made available for access by robotic devices.

In some examples, the robotic device may store existing heuristics for interaction with a given environment, and may determine a refinement to one of the existing heuristics for interaction with a given environment during performance of the activity. The robotic device may then share with the second device in substantially real-time information associated with the refinement to the existing heuristic for interaction with the given environment.

4. Robot and Cloud Functions

As mentioned, robots (or any client computing device) may interact with the cloud to perform any number of functions. Additional example functions are described below.

a. Object Recognition

Figure 7:
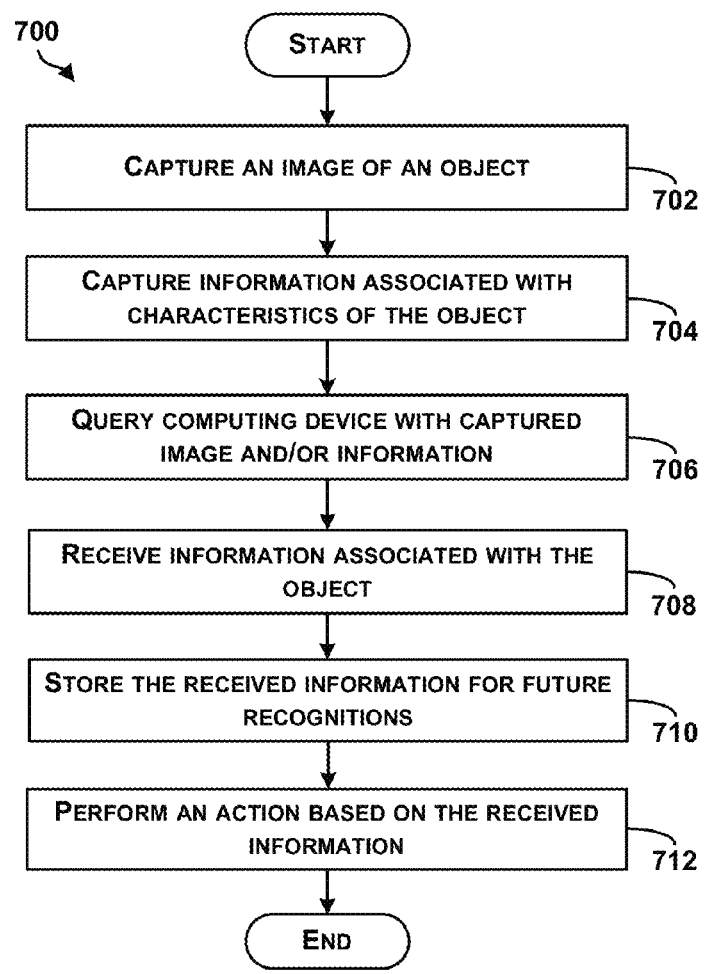
FIG. 7 is a block diagram of an example method of a robot interaction with the cloud to facilitate object recognition.

FIG. 7 is a block diagram of an example method of a robot interaction with the cloud to facilitate object recognition, in accordance with at least some embodiments described herein. Method 700 shown in FIG. 7 presents an embodiment of a method that, for example, could be used with the systems 100, 400, and 420, for example, and may be performed by a device, such as another devices illustrated in FIGS. 1-4, or components of the device. Method 700 may include one or more operations, functions, or actions as illustrated by one or more of blocks 702-712. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 700 and other processes and methods disclosed herein, each block in FIG. 7 may represent circuitry that is wired to perform the specific logical functions in the process.

At block 702, the method 700 includes capture an image of an object. In an example, a robot may capture many images of objects using any number of sensors, such as a camera (still pictures or video feeds), infrared projectors, etc.

At block 704, the method 700 includes capture information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 706, the method 700 includes query a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 708, the method 700 includes receive information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 710, the method 700 includes store the received information for future recognitions. For example, after receiving the information from the cloud, the robot would be able to recognize the object in the future enabling the robot to learn and adapt.

At block 712, the method 700 includes perform an action based on the received information. The action may vary based on a type of received information, or the query that is presented by the robot. As an example, a robot may capture an image of a coffee maker, provide the image to the cloud, and in response receive details about the coffee maker including an identity, model number, and instructions for use. The robot may then perform actions according to the instructions for use to use the coffee maker. As another example, a robot may open a refrigerator, take inventory of objects inside (e.g., capture images, identify objects), determine/receive recipes for possible meals based on the determined inventory, and suggest a meal based on items in the refrigerator.

As an example, the robot may query the cloud to identify an object and details of the object to enable the robot to interact with the object. If the received information is not fully accurate (e.g., the robot determines a different weight of the object), the robot can share this information with the cloud to update/modify a shared database in the cloud.

As an additional or alternative method for performing object recognition, objects may be tagged with a type of identifier (e.g., radio frequency identification (RFID) chip, near field communication chip (NFC), bar code, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (RFID in an employee's ID badge) to perform tracking of objects.

Figure 8:
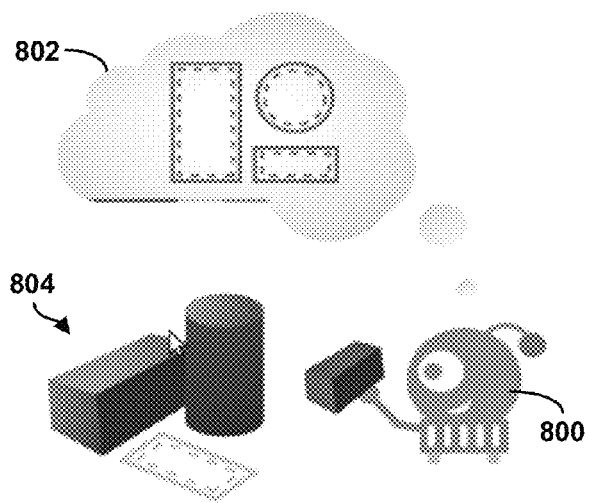
FIG. 8 is an example conceptual illustration of a robot interacting with a cloud to perform object recognition and interaction.

FIG. 8 is an example conceptual illustration of a robot 800 interacting with a cloud 802 to perform object recognition and interaction, or other functions as described in FIG. 7. The robot 800 may interact with an object (such as any of objects 804), and interact with the cloud 802 as described above to further interact with the object.

In some examples, the method 700 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 700, the robot may execute software to perform function calls, such as GetObject( ) which may return information associated with an object (e.g., a cereal box), or PickUpObject( ) which may cause the robot to pick up the object. Enabling function calls and operation of robots through the cloud facilitates control and operation of the robot without having to control or operate various sensors/mechanical aspects of the robot, for example.

b. Mapping Functions

Figure 9:
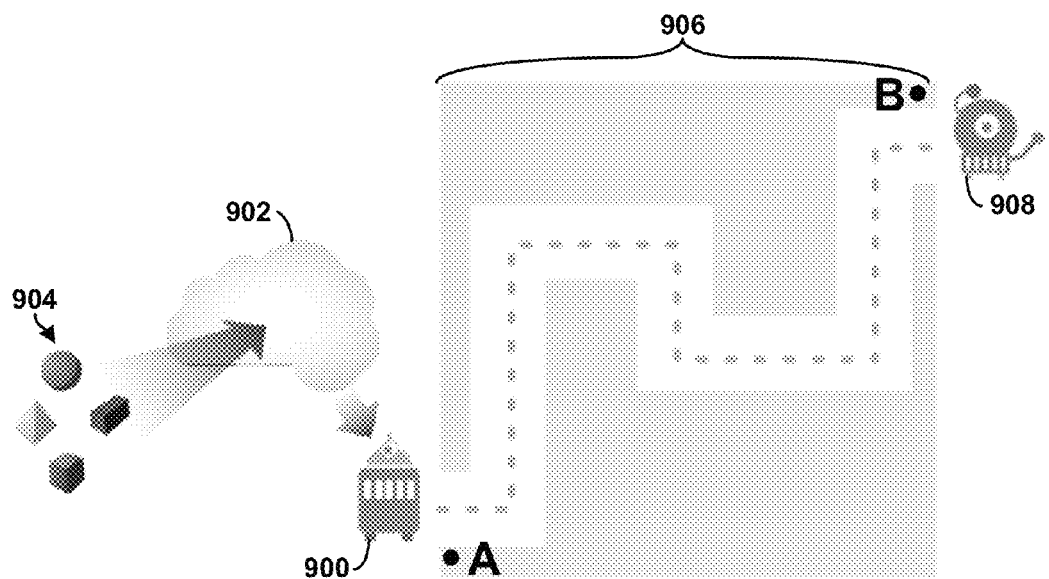
FIG. 9 is an example conceptual illustration of a mapping function.

FIG. 9 is an example conceptual illustration of a mapping function. A robot 900 may interact with a cloud 902 to perform functions as described in FIG. 7, for example, such as to perform object recognition queries of objects 904. The robot 900 may traverse through an area 906 in any number of pathways so as to map the area. As an example, the robot 900 may be configured to roam around an area in which the robot 900 is located to create a map of the area 906 (e.g., room of a house) with the aid of cloud processing. As the robot 900 navigates through the area 906 using any number of sensors to determine nearness to objects or capture images of objects, the robot 900 may relay data collected from various sensors to the cloud 902. The robot 900 may use sensors to return still pictures, video, location information, and distance information to the cloud computing system.

To perform mapping functions, the robot 900 may traverse through the area 906 capturing images using a range camera, video camera, etc., and send the data to the cloud 902. The robot 900 (or servers in the cloud 902) may identify objects within the data and provide annotations (such as mass, shape, material, etc.) of the objects. A computerized map may be generated to represent the area 906, and computer graphics (e.g., low resolution graphics) can be used to represent identified objects.

As another robot and cloud function, computer graphics within the generated map of the area 906 may be replaced with high resolution images of the objects. For example, the robot 900 may capture an image of a couch, and the cloud 902 may identify a specific model of the couch, and perform a search within a database to locate/identify a retailer that manufactures/sells the couch. A server in the cloud 902 may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Figure 10:
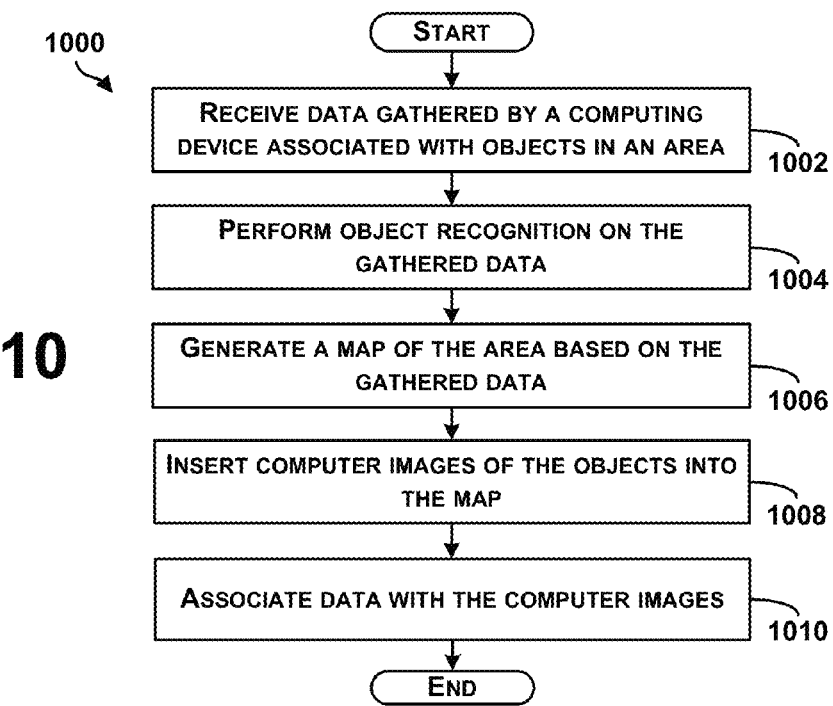
FIG. 10 is a block diagram of an example method for mapping of objects in an area or mapping an area.

FIG. 10 is a block diagram of an example method for mapping of objects in an area or mapping an area, in accordance with at least some embodiments described herein. Method 1000 shown in FIG. 10 presents an embodiment of a method that, for example, could be used with the systems 100, 400, and 420, for example, and may be performed by a device, such as another devices illustrated in FIGS. 1-4, or components of the device. The various blocks of method 1000 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1002, the method 1000 includes receive data gathered by a computing device associated with objects in an area. For example, a robot may traverse an area and capture raw data (e.g., such as point map data) and images (e.g., still or video feed) using a range camera, video camera, still camera, etc. The robot may provide the gathered data to the cloud, which may receive the gathered data. Additionally, the cloud may receive gathered metadata associated with the objects in the area, such as a time the data was collected, a location (e.g., GPS location) at which the data was collected, or other characteristics regarding when/how the data was collected.

At block 1004, the method 1000 includes perform object recognition on the gathered data. A server on the cloud may interpret objects, and further, shapes can be matched with a three-dimensional warehouse or database of objects to identify representations of the point maps. The server may use any type of object recognition methods, such as by matching edges, colors, variances, etc., of the gathered data to known objects within a database. The objects within the database may have associated metadata indicating characteristics of the objects.

Thus, the server can perform object extraction to identify and extract objects from the received data. The server can further localize the objects precisely in a map and provide annotations for the objects. Example annotations include mass, shape, material, etc. of the object. Annotated objects may be stored and shared through a global object database, such as, the database 412 in FIG. 4A.

At block 1006, the method 1000 includes generate a map of the area based on the gathered data. For example, the server may use locations of the data collected as well as times the data was collected to interpret a path traversed by the robot and to create a conceptual map. The map may be further generated based on circumstantial data of the recognized objects, such as size and shape of the object. If an object has a known size and shape, and the location of the object is known, an estimated area at which the object is present can be determined.

At block 1008, the method 1000 includes insert computer images of the objects into the map. For example, the server may retrieve a computer image of the recognized object (e.g., television), and insert the object into the location on the generated map at which the object is present.

At block 1010, the method 1000 includes associate data with the computer images. For example, the server may associate any number of metadata with the computer image, or may alternatively, retrieve metadata or other high resolution images representing the object from a retailer's database for insertion into the computer generated map. As described above, an image of a couch may be captured, and the server may identify a specific model of the couch, and perform a search within a database to locate/identify a retailer that manufactures/sells the couch. A server in the cloud may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Thus, in some examples, a robot builds shapes and appearances of all objects in a scene and performs object recognition as possible (with the help of the cloud) to provide an annotated map of objects. Raw data is gathered (e.g., point map) and used with camera data (e.g., indicates color/texture of objects) to interpret objects, and further, shapes can be matched with a 3D warehouse of objects to identify representations of the point clouds.

Figure 11A:
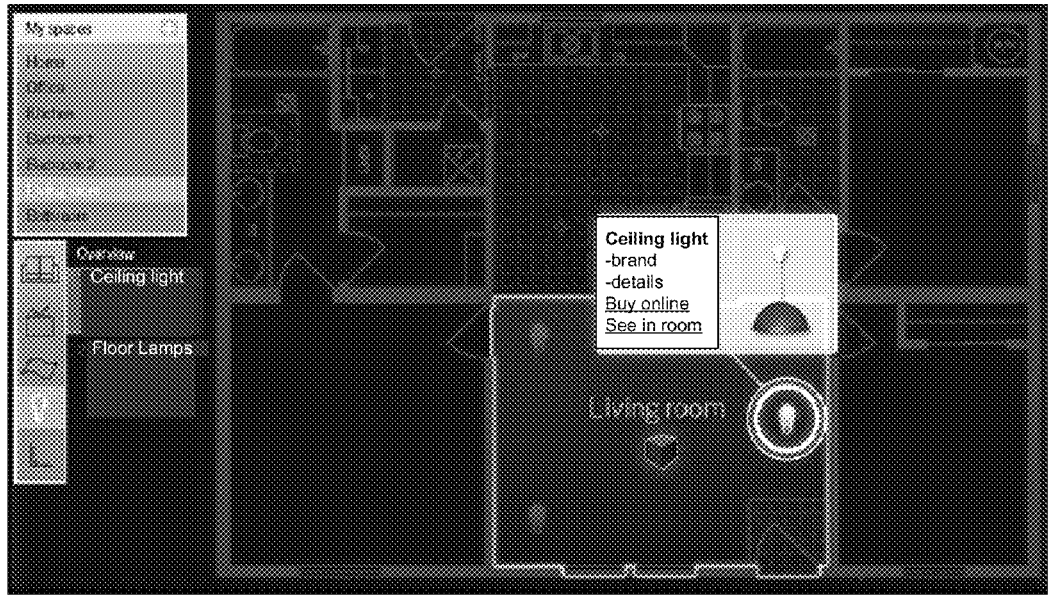
FIGS. 11A-11B are example interfaces illustrating a map of an area, and objects in the map.
Figure 11B:
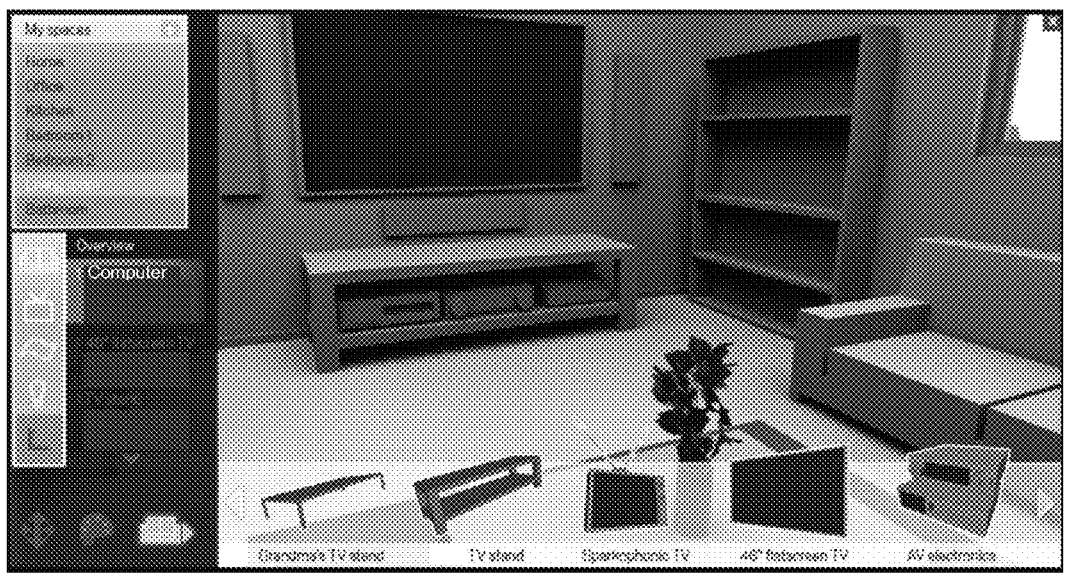

FIGS. 11A-11B are example interfaces illustrating a map of an area, and objects in the map. For example, in FIG. 11A, a home has been outlined (e.g., in a blueprint format) to show different rooms in the home. Items in the home may also have been mapped. FIG. 11B illustrates an example interface illustrating mapping of objects in a room. In some examples, the interfaces in FIGS. 11A-11B, and methods described herein, may enable a user to determine configurations of rooms, and objects in the rooms. As one example, a user may be in a store and identify a few television stands that the user would like to purchase; however, the user would like to see how the television stands look/fit into the room configuration. The user may capture some images of the television stands using a device, cause the device to perform object recognition (e.g., using the method 700 in FIG. 7), access the interface in FIG. 11A to select a room in which to place the television stand, and access the interface in FIG. 11B to insert the new television stand in place of an old television stand (e.g., swap out the old television stand with the new television stand and place the television and peripherals into a desired configuration). The example interfaces in FIGS. 11A-11B may be used to maneuver computer generated objects in a room, for example.

In further examples, the interfaces in FIGS. 11A-11B may provide information (e.g., metadata) regarding rooms or objects in the rooms as determined during a mapping of the room. For example, the interface in FIG. 11A may indicate details regarding a ceiling light, such as a brand name, a model number, details regarding light bulbs used by the ceiling light, etc., and the metadata may provide links to purchase the ceiling light or accessories online, or a link to see the ceiling light in the room, such as a link to the example interface in FIG. 11B.

c. Navigation Functions

Referring back to FIG. 9, in one example, the robot 900 may receive instructions to navigate from point A to point B across the area 906. The robot 908 may have completed this navigation previously, and may have uploaded information regarding a possible navigation pathway to the cloud. The robot 908 may have documented objects along the pathway, and also, possible obstructions as well. The robot 900 may query the cloud requesting navigation instructions to traverse from point A to point B (e.g., a map), and may receive in response, the navigation pathway shown in FIG. 9 as previously traveled by the robot 908. In this manner, the robots may share information to enable learning of the area 906.

In addition, the robot 900 may have limited memory, and in one example, to enable and manage updates, a server may include or store data to be provided to the robot 900. For instance, the robot 900 may not download "the entire world" of data, but rather, may download data representing immediate surroundings into a local cache to perform actions, such as to traverse through a portion of the area 906. The robot 900 may download additional data when needed. Furthermore, downloads can occur from the server to the robot 900, or through peer-to-peer sharing (e.g., from the robot 908 to the robot 900). Still further, basic instructions for mobility, safety, and general robot operation can be stored on-board the robot 900, while instructions for higher-level functionality may be stored in the cloud 902 and accessed by the robot 900 as needed. In some examples, the robot 900 can use "Just in Time" downloading where high level data can be downloaded first, followed by lower level data streamed as needed. In some examples, providing business logic stored in the cloud 902 enables fleet-wide upgrades to all robots.

In addition, "slug" trails may be used for shared information (i.e., information that may be used for object recognition). A slug trail may be indicative of previous requests and matching responses. Thus, in a multi-node system, the request/response can be cached so that future requests hit an answer sooner in path. For example, if the robot 900 is navigating through the area 906 and notices a hallway is blocked, the robot 900 can publish an update on the pathway so that other robots learn of the obstacle and other problems/constraints, and may request/receive an alternate pathway. Any interaction that the robot 900 experiences can be published to the cloud so that the robot 900 logs interactions to be shared amongst all robots. Specific locations may trigger robots to download new information. For example, when entering a new room, data about the room may be retrieved that was collected by another robot.

In other examples, other forms of digital fingerprints or footprints, in addition to or rather than, slug trails may be used.

d. Inventory/Differential Functions

Figure 12:
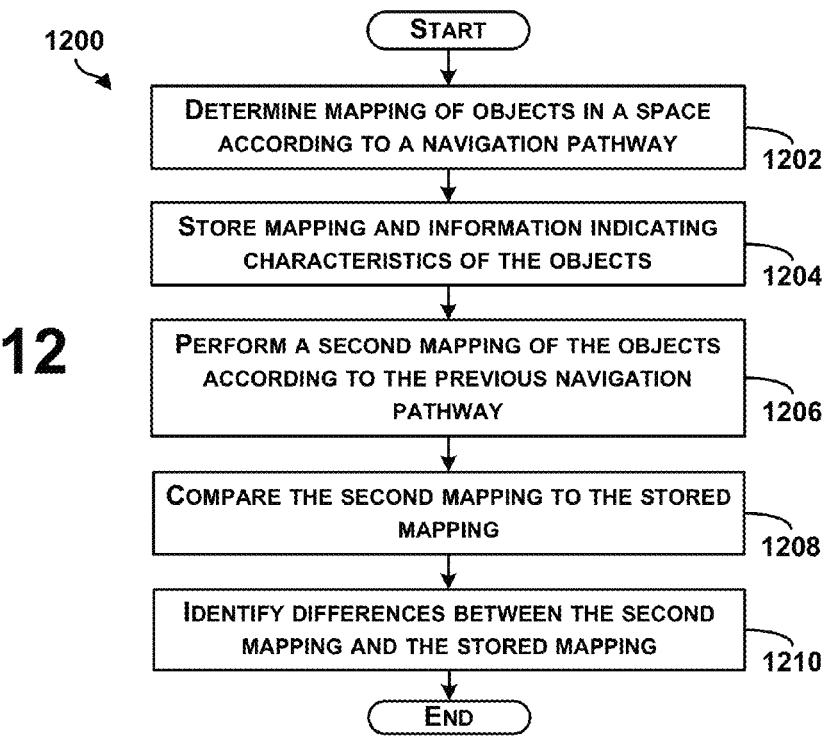
FIG. 12 is a block diagram of an example method for mapping of objects in an area and performing inventory of objects.

FIG. 12 is a block diagram of an example method for mapping of objects in an area and performing inventory of objects, in accordance with at least some embodiments described herein. Method 1200 shown in FIG. 12 presents an embodiment of a method that, for example, could be used with the systems 100 and 400, for example, and may be performed by a device, such as another devices illustrated in FIGS. 1-4, or components of the device. The various blocks of method 1200 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1202, the method 1200 includes determine mapping of objects in a space according to a navigation pathway. For example, a robot may move through an area and perform object recognition and generate a map, as described above using method 700 in FIG. 7 and method 1000 in FIG. 10. The robot may be configured to follow a predetermined navigation pathway through an area, or may follow a random navigation pathway through the area. The robot may store or associate the navigation pathway with the determined mapping of the area, so that a record is formed of the navigation pathway used to determine the mapping. In one instance, based on the navigation pathway, the mapping may be different (e.g., a robot may not map an entirety of an area or take account a full inventory of all objects in an area).

The mapping of the area may be, in one example, an inventory of objects in the area. As the robot traverses through the area capturing images and performing object recognition, the robot may determine what objects are present, and determine locations of objects in the area.

At block 1204, the method 1200 includes store mapping and information indicating characteristics of the objects. For example, the robot may store the mapping locally on memory of the robot or within the cloud. The robot may further store associated information indicating characteristics of the objects with the mapping of the objects, such as, metadata describing details of the objects (weight, color, model number, size, shape, etc.).

At block 1206, the method 1200 includes perform a second mapping of the objects according to the previous navigation pathway. For example, at a later time, the robot may perform another mapping of the area using the same navigation pathway so as to take an inventory of the area at the later time. The robot may follow the same (or substantially same) navigation pathway previously used so that the same (or substantially same) mapping of the area and objects in the area can be determined.

At block 1208, the method 1200 includes compare the second mapping to the stored mapping, and at block 1210, the method 1200 includes identify differences between the second mapping and the stored mapping. By comparing the two mappings, differences between the mapping can be identified to determine differences in the inventoried objects.

As an example using the method 1200 of FIG. 12, a user may configure an area (e.g., bedroom) into a default configuration (e.g., where all clothes are picked up off the ground, items are arranged and the room is cleaned). The user may request the robot to perform a mapping and inventory of objects in the bedroom with the bedroom in the default configuration. Following, if the user has misplaced an item, the user may request the robot to perform a new inventory of the room, and the new inventory can be compared to the default inventory to determine what changes have been made to the bedroom (e.g., what objects are not in the default location).

As another example using the method 1200 of FIG. 12, a user may configure a stock room at a retail store into a default configuration (e.g., all shelves are fully stocked). The user may request the robot to perform a mapping and inventory of objects in the stock room with the room in the default configuration. Following, the user may request the robot to perform a new inventory of the stock room to determine what items have been sold. The new inventory can be compared to the default inventory to determine what changes have been made to the stock room, such as, to indicate a current supply of items in the stock room that can be used to configure future orders. The default inventory map may thus be a benchmark map of the room in a clean state, so that subsequent maps can be performed to determine a differential between the benchmark and a current condition of the room.

Thus, in some examples, a robot may create an inventory of objects in a room or scene, along with a mapping of the objects to catalog all objects in the space and to store details of the objects (e.g., name, shape, color, last known location, etc.). The robot may have a navigation path that is followed to inventory a space, so that the same navigation path can be traversed to identify missing/new objects.

e. Voice Recognition/Control

Figure 13:
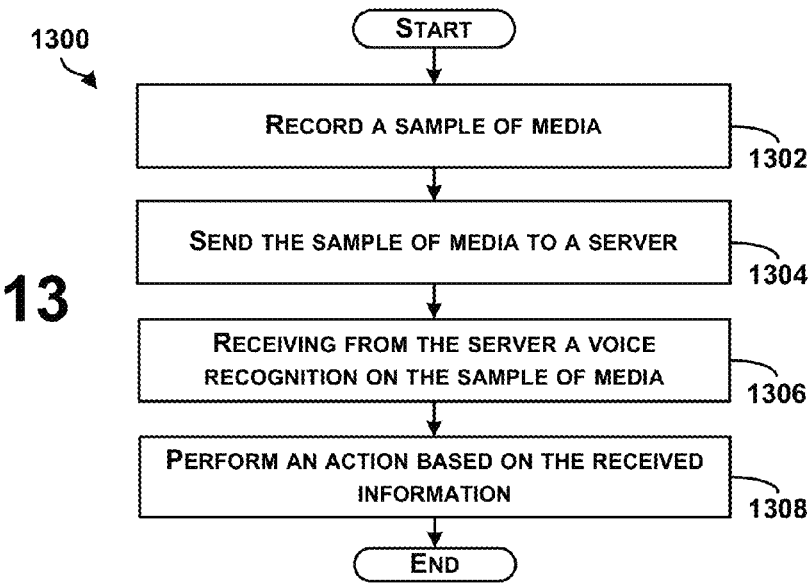
FIG. 13 is a block diagram of an example method for performing voice recognition/control by a robot, all arranged in accordance with at least some embodiments described herein.

FIG. 13 is a block diagram of an example method for performing voice recognition/control by a robot, in accordance with at least some embodiments described herein. Method 1300 shown in FIG. 13 presents an embodiment of a method that, for example, could be used with the systems 100 and 400, for example, and may be performed by a device, such as another devices illustrated in FIGS. 1-4, or components of the device. The various blocks of method 1300 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1302, the method 1300 includes record a sample of media. For example, a user may interact with a robot by speaking to the robot, and the robot may record the speech of the user. The robot may record samples of speech from other areas as well (e.g., televisions, radio, etc.) and of other types of media, such as music, video, live performances, etc.

At block 1304, the method 1300 includes send the sample of media to a server. For example, the robot may be configured to communicate with a server (e.g., the "cloud"), and may send the sample of media using wired or wireless communication to the server.

At block 1306, the method 1300 includes receiving from the server a voice recognition on the sample of media. The server may use any number of known techniques for performing voice recognition, and may provide a response to the robot. The voice recognition response may include a textual equivalent of the speech, such as when the server performs speech to text processes.

At block 1308, the method 1300 includes perform an action based on the received information. In one example, the voice recognition response may also include a command or instructions indicating actions for the robot to perform. In this example, the server may perform a voice recognition, and may further identify actions to be performed by the robot in response to the voice recognition. As a specific example, the user may speak "call John" to the robot. The robot may record the speech and send the speech sample to the server. The server may recognize the speech, and return a voice recognition response to the robot with instructions for the robot to call a user named John at the phone number 555-1234. The robot may then initialize a phone call to John using internal phone capabilities. If the robot is not equipped with a wired or wireless telephone, the voice recognition response may further include instructions to the robot for how to initialize the phone call, such as to provide a map to the robot of where a telephone is located, provide a navigation pathway to the robot to instruct the robot how to traverse to the telephone, provide instructions how to use the telephone to the robot, and provide the phone number of John to the robot.

f. Contextual/Situational Robot Functions

A robot may perform any actions or queries to the cloud as described herein based on contextual or situational information.

In an example, a robot may have information relating to a local environment in which the robot operates (e.g., a local map, a location, etc.) and this information can be used as constraints for recognition systems that are used to identify objects within captured data by the robot. For example, if the robot is in an office, the robot may access an "office" database of objects within the cloud to perform object or data recognitions. Thus, the robot may send to the cloud a query to determine or identify an object within gathered data, and the query may include contextual information, such as an indication of a location of the robot. The server may use the contextual information to select a database in which to search for a matching object.

Thus, in some examples, a robot may use location, or possible nearby objects as constraints into recognition systems to provide a context of the environment enabling object recognition to be performed using a subset or a limited set of nouns/verbs/objects to improve recognition accuracy.

As another example, the robot may operate with situational awareness such that a robot may inventory objects in a scene, and if given a command by a user, the robot can determine the content or interpret the meaning of the command based on a situation of the scene or by comparing with objects in the scene (e.g., command is to retrieve a cola from the refrigerator, and robot can use limited database warehouse of objects associated with "house" to quickly identify refrigerator/cola, etc.). The robot may be configured to use contextual as well as situational data to help perform decision making.

In still another example, a robot may perform actions using contextual/situational data, such as time of day, weather outside, etc. For example, at night a robot may be configured to move more slowly and make less noise to be quiet than as compared to operations during the day. In another example, in the morning a robot may offer coffee to a person as opposed to a soft drink. Other situational examples that may affect configurations of robot actions include if the weather is rainy, the robot may offer an umbrella to the person, or based on what a person is wearing, the robot may offer suggestions as to whether the person will be hot/cold due to weather. Thus, the robot may take context/situation into account, as well as whom the robot is interacting with when determining an appropriate response/function. Still further, a robot may make a sound of presence, intent, state, based on context/situations.

As still another example, a voice recognition database (or information from a voice recognition database) may be provided to a client device (e.g., robot) to enable the robot to perform voice/speech recognition locally. The voice recognition database may be provided based on a current state of the robot. As an example, if a robot is in an office setting, an office database for voice recognition may be provided to the robot to enable a voice recognition process to be performed more quickly than having the robot search within a database for all settings. Any situational or contextual information of the robot may be used to select a voice recognition database to provide to the robot. As other examples, a time of day, context of a conversation, location of the robot, etc. may be used individually or in combination to select a voice recognition database to provide to the robot.

5. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a system comprising a processor, the method comprising:

receiving a request from a robotic device for access to a data library to receive a data element stored in the data library, the request including information associated with a task of the robotic device and the data library storing data elements that include information configured for use by a given robotic device and that are associated with instructions executable by the given robotic device to perform a heuristic for interaction with an environment the data elements being further associated with respective metadata that is indicative of a requirement of the given robotic device for using a given data element to perform at least a portion of an associated heuristic for interaction with the environment, and the metadata indicating the requirement for the robotic device to include or have access to one or more of a sensor or a mechanical actuator required to perform a given task via execution of the given data element;

determining instructions of data elements that are executable to perform at least a portion of the task of the robotic device;

determining data elements from among the data elements stored in the data library that include the instructions executable by the robotic device to perform the portion of the task of the robotic device;

determining which of the determined data elements are associated with metadata indicating one or more requirements for the robotic device that match capabilities of the robotic device so as to determine one or more matching data elements; and causing one of the matching data elements to be conveyed to the robotic device.

2. The method of claim 1, further comprising determining one or more matching data elements based on an environment in which the robotic device resides.

3. The method of claim 1, wherein the one of the matching data elements includes information associated with a map configured for use by the robotic device.

4. The method of claim 1, wherein the one of the matching data elements includes information associated with a remote operation of the task, wherein the remote operation of the task includes the robotic device being remotely operated by a user to perform the task.

5. The method of claim 1, wherein the robotic device includes an application configured to receive application-specific instructions, and wherein the one of the matching data elements includes a set of application-specific instructions for use in the application, wherein causing the one of the matching data elements to be conveyed to the robotic device comprises downloading an update of the set of application-specific instructions for use in the application to the robotic device.

6. The method of claim 1, wherein causing the one of the matching data elements to be conveyed to the robotic device comprises:
   determining a time when the robotic device is in a standby mode, wherein the standby mode is indicative of the robotic device not in operation; and
   causing the one of the matching data elements to be conveyed to the robotic device during the time when the robotic device is in the standby mode.

7. The method of claim 1, wherein causing the one of the matching data elements to be conveyed to the robotic device comprises:
   receiving payment for the one of the matching data elements; and
   sending the one of the matching data elements to the robotic device.

8. The method of claim 1, further comprising receiving from the robotic device feedback indicating information associated with a rating of the one of the matching data elements, wherein the rating is indicative of an amount of success by the robotic device to perform at least a portion of the task via execution of the one of the matching data elements.

9. The method of claim 8, wherein the data library stores data elements that are derived from information received from robotic devices and determined by the robotic devices during performance of given tasks, and wherein the data elements are further associated with a respective rating, wherein the respective rating is indicative of an amount of success by a respective robotic device to perform at least a portion of a respective task via execution of a respective data element, and the method further comprises:
   determining the one of the matching data elements from among the data elements stored in the data library based also on the respective rating of the one of the matching data elements.

10. The method of claim 1, further comprising:
    receiving from the robotic device at least a portion of information associated with a second heuristic for interaction with the environment, wherein the portion of information associated with the second heuristic for interaction with the environment comprises information associated with a state of the robotic device and a function performed by the robotic device to carry out at least a portion of a given task, the portion of information determined by the robotic device during performance of the given task; and
    modifying the data library based on the portion of information associated with the second heuristic for interaction with the environment.

11. The method of claim 10, further comprising sharing with a second robotic device in substantially real-time the portion of the information associated with the second heuristic for interaction with the environment such that applicability of the information associated with the second heuristic for interaction with the environment expires after a certain amount of time.

12. The method of claim 1, further comprising:
    receiving from a plurality of robotic devices information associated with heuristics for interaction with environments, the heuristics based on experiences of the plurality of robotic devices;
    determining a function based on the information associated with heuristics for interaction with environments received from the plurality of robotic devices; and
    making the function available for access as a respective data element in the data library.

13. The method of claim 1, further comprising:
    determining a second data element that is relevant to an activity of the robotic device; and
    in response, causing the second data element to be offered for purchase to the robotic device.

14. A non-transitory computer readable medium having stored therein instructions executable by a computing device to cause the computing device to perform functions comprising:
    receiving a request from a robotic device for access to a data library to receive a data element stored in the data library, the request including information associated with a task of the robotic device and the data library storing data elements that include information configured for use by a given robotic device and that are associated with instructions executable by the given robotic device to perform a heuristic for interaction with an environment, the data elements being further associated with respective metadata that is indicative of a requirement of the given robotic device for using a given data element to perform at least a portion of an associated heuristic for interaction with the environment, and the metadata indicating the requirement for the robotic device to include or have access to one or more of a sensor or a mechanical actuator required to perform a given task via execution of the given data element;
    determining instructions of data elements that are executable to perform at least a portion of the task of the robotic device;
    determining data elements from among the data elements stored in the data library that include the instructions executable by the robotic device to perform the portion of the task of the robotic device;
    determining which of the determined data elements are associated with metadata indicating one or more requirements for the robotic device that match capabilities of the robotic device so as to determine one or more matching data elements; and
    causing one of the matching data elements to be conveyed to the robotic device.

15. A system comprising:
    an interface configured to provide communication between a robotic device and a data library, the data library storing data elements including information configured for use by a given robotic device and that are associated with instructions executable by the given robotic device to perform a heuristic for interaction with an environment, the data elements stored in the data library being further associated with respective metadata that is indicative of a requirement of the given robotic device for using a given data element to perform at least a portion of an associated heuristic for interaction with the environment, and the metadata indicating the requirement for the robotic device to include or have access to one or more of a sensor or a mechanical actuator required to perform a given task via execution of the given data element;
    a control unit configured to:
      determine instructions of data elements that are executable to perform at least a portion of the task of the robotic device;

determine data elements from among the data elements stored in the data library that include the instructions executable by the robotic device to perform the portion of a task of the robotic device, determine which of the determined data elements are associated with metadata indicating one or more requirements for the robotic device that match capabilities of the robotic device so as to determine one or more matching data elements, and to cause one of the matching data elements to be conveyed to the robotic device via the interface; and an update unit configured to provide to the robotic device via the interface an update of the instructions associated with a corresponding data element stored on the robotic device.

16. The system of claim 15, wherein the control unit is configured to determine one of the matching data elements further based on one or more of user preferences for the robotic device, an environment in which the robotic device resides, capabilities of the robotic device, and a software developer of the data element.

17. The system of claim 15, wherein the control unit is configured to receive from the robotic device feedback indicating information associated with a rating of one of the matching data elements, wherein the rating is indicative of an amount of success by the robotic device to perform at least a portion of the task via execution of the one of the matching data elements.

18. A method comprising:
a robotic device performing an activity;
the robotic device determining a heuristic for interaction with an environment during performance of the activity; and
in response, the robotic device sharing with a second robotic device in substantially real-time at least a portion of information associated with the heuristic for interaction with the environment, wherein the portion of information associated with the heuristic for interaction with the environment comprises information associated with a state of the robotic device and a function performed by the robotic device to carry out at least a portion of the activity.

19. The method of claim 18, further comprising:
the robotic device storing existing heuristics for interaction with a given environment;
the robotic device determining a refinement to one of the existing heuristics for interaction with a given environment during performance of the activity; and
the robotic device sharing with the second robotic device in substantially real-time information associated with the refinement to the existing heuristic for interaction with the given environment.

20. The method of claim 18, further comprising:
the robotic device making a determination of requiring additional information to perform the activity; and
based on the determination, the robotic device responsively accessing a data library to search for a given data element associated with the additional information.

21. The method of claim 18, wherein applicability of the information expires after a certain amount of time.

22. The method of claim 18, wherein the robotic device determining the heuristic for interaction with the environment during performance of the activity comprises the robotic device determining at least a partially unknown model of functions to execute so as to perform at least a portion of the activity to achieve a desired output behavior.

* * * * *